United States Patent
Lee et al.

(10) Patent No.: US 8,302,973 B2
(45) Date of Patent: Nov. 6, 2012

(54) ACTIVE GEOMETRY CONTROL SUSPENSION

(75) Inventors: Un Koo Lee, Hwaseong (KR); Sang Ho Lee, Hwaseong (KR); Hae Ryong Choi, Hwaseong (KR); Sung Bae Jang, Suwon (KR); Byung Gu Kang, Seoul (KR)

(73) Assignee: Hyundai Motor Company, Seoul (KR)

( * ) Notice: Subject to any disclaimer, the term of this patent is extended or adjusted under 35 U.S.C. 154(b) by 147 days.

(21) Appl. No.: 12/835,330

(22) Filed: Jul. 13, 2010

(65) Prior Publication Data

US 2011/0042907 A1 Feb. 24, 2011

(30) Foreign Application Priority Data

Aug. 21, 2009 (KR) .................... 10-2009-0077853

(51) Int. Cl.
*B60G 17/016* (2006.01)
*B60G 7/00* (2006.01)
*B62D 17/00* (2006.01)

(52) U.S. Cl. ................. 280/5.52; 280/5.522; 280/86.75; 280/86.758

(58) Field of Classification Search ................. 280/5.52, 280/5.522, 86.75, 86.758
See application file for complete search history.

(56) References Cited

U.S. PATENT DOCUMENTS

| | | | | |
|---|---|---|---|---|
| 3,887,211 A | * | 6/1975 | Mazur | 280/86.758 |
| 4,616,845 A | * | 10/1986 | Pettibone | 280/86.753 |
| 4,726,603 A | * | 2/1988 | Sugiyama et al. | 280/86.758 |
| 4,811,969 A | * | 3/1989 | Sugiyama | 280/5.522 |
| 5,141,069 A | * | 8/1992 | Yasui | 180/422 |
| 5,292,149 A | * | 3/1994 | Luger | 280/5.521 |
| 5,700,025 A | * | 12/1997 | Lee | 280/86.751 |
| 6,047,789 A | * | 4/2000 | Iwanaga | 180/440 |
| 7,370,552 B2 | * | 5/2008 | Yun | 74/484 R |
| 7,621,539 B2 | * | 11/2009 | Choi et al. | 280/5.52 |
| 7,905,500 B2 | * | 3/2011 | Choi et al. | 280/5.523 |
| 8,226,091 B2 | * | 7/2012 | Lee | 280/5.52 |
| 2008/0079225 A1 | * | 4/2008 | Choi et al. | 280/5.52 |
| 2011/0233880 A1 | * | 9/2011 | Lee | 280/5.5 |

FOREIGN PATENT DOCUMENTS

| | | |
|---|---|---|
| JP | 5-178231 A | 7/1993 |
| KR | 10-0597122 B1 | 7/2006 |
| KR | 10-0674137 B1 | 1/2007 |
| KR | 10-2007-0079739 A | 8/2007 |
| KR | 10-2007-0080945 A | 8/2007 |

* cited by examiner

*Primary Examiner* — Paul N Dickson
*Assistant Examiner* — Laura Freedman
(74) *Attorney, Agent, or Firm* — Morgan, Lewis & Bockius LLP

(57) ABSTRACT

An active geometry control suspension, may include an assist link of which a wheel is connected to one end portion thereof to guide a movement of the wheel, a moving member, one portion of which is pivotally fixed to the other end portion of the assist link, a guide formed in the moving member and including a slot to slidably receive the moving member therein so as to guide a movement of the moving member, a body that is fixed to a vehicle body to connect the guide thereto, and a driving portion coupled to the other portion of the moving member and moving the moving member along the slot to vary a position of the assist link and thus to vary an alignment angle of the wheel.

9 Claims, 3 Drawing Sheets

ACTIVE GEOMETRY CONTROL SUSPENSION

CROSS-REFERENCE TO RELATED APPLICATION

This application claims priority to Korean Patent Application No. 10-2009-0077853 filed on Aug. 21, 2009, the entire contents of which are incorporated herein for all purposes by this reference.

BACKGROUND OF THE INVENTION

1. Field of the Invention

The present invention relates to a suspension. More particularly, the present invention relates to an active geometry control suspension that varies the alignment angle of a wheel according to the running state to improve running stability.

2. Description of Related Art

Generally, an active geometry control suspension (AGCS) improves turning stability while a vehicle is moving.

The AGCS includes an actuator that is operated according to an electrical signal during high-speed turning of the vehicle, a control lever that is controlled by the actuator, and an assist link that is moved downward by the control lever to control toe-in angle of a rear wheel.

The AGCS receives the signal sensing the turning of the vehicle and steering angle, to control the toe-in angle of the rear wheel by the actuator such that the turning of the vehicle becomes stable.

FIG. 3 is a schematic diagram of a general active geometry control suspension.

Referring to FIG. 3, an active geometry control suspension includes an assist link 35, a control lever 34, and an actuator 31, and an operating rod 32 is formed on an end portion of the actuator 31.

One end of the assist link 35 is connected to the link structure of a wheel, and the other end of the assist link 35 is connected to the control lever 34. The control lever 34 rotates based on the fixing hinge 33, one end thereof is connected to the assist link 35, and the other end thereof is connected to the operating rod 32.

If the actuator 31 pulls up the operating rod 32, the control lever 34 rotates in a clockwise direction based on the fixing hinge 33 to push out the assist link 35, and if the actuator 31 pushes out the operating bar 32, the control lever 34 rotates in an opposite direction based on the fixing hinge 33 to draws the assist link 35 near.

The toe-in angle of the wheel is varied according to movement of the assist link 35, and particularly the toe-in angle is reduced on a straight road, and the toe-in angle is increased in a high-speed turning condition.

A control portion (30, ECU) detects the speed and the steering angle of the vehicle to increase the toe-in angle of the wheel if the vehicle speed and the steering angle are respectively higher than a predetermined value so as to improve the stability of the vehicle.

However, a road-impact of the wheel of the vehicle is transferred to the actuator 1 such that the durability thereof is deteriorated. In addition, so as to improve the durability, make the assembly structure solid, and securely fix the actuator 31, there is a problem that the manufacturing cost thereof is increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an active geometry control suspension that has a simple structure, and reduces a vertical load or a horizontal load that are transferred to an actuator such that the durability and the stability thereof are improved.

In an aspect of the present invention, the active geometry control suspension may include an assist link of which a wheel is connected to one end portion thereof to guide a movement of the wheel; a moving member, one portion of which is pivotally fixed to the other end portion of the assist link; a guide formed in the moving member and including a slot to slidably receive the moving member therein so as to guide a movement of the moving member; a body that is fixed to a vehicle body to connect the guide thereto; and a driving portion coupled to the other portion of the moving member and moving the moving member along the slot to vary a position of the assist link and thus to vary an alignment angle of the wheel.

The driving portion may include a driving shaft that is rotatably fixed on the guide; a control arm that extends from the drive shaft to be pivotally connected to the other portion of the moving member through a connection pin formed in the moving member, and; a driving actuator that is mounted on the body and selectively actuates the drive shaft to move the moving member along the slot of the guide.

The control arm may include a connecting slot formed along a longitudinal direction of the control arm and configured to be coupled to the connection pin.

The other end portion of the assist link and the other portion of the moving member may be offset in a predetermined distance therebetween.

The slot that is formed in the guide may have a predetermined curvature radius with respect to the drive shaft.

The driving actuator may be a drive motor and a reduction gear may be disposed between the drive motor and the drive shaft to increase rotation torque of the drive motor.

A longitudinal axis of the assist link and a tangential vector of a movement direction of the moving member may not form a zero or straight angle therebetween.

The drive shaft may be coupled to the guide in one direction and the slot may be formed in the other direction in the guide, the one direction of the drive shaft and the other direction of the slot being approximately perpendicular therebetween, wherein the drive shaft may be disposed in a front and rear direction to be rotatably fixed on the body, and the slot may be formed in an up and down direction.

A fixing bracket may be disposed at an end portion of the guide to be connected to the vehicle body.

The alignment angle may be a toe-in angle, and the toe-in angle is reduced when the vehicle goes straight and is increased when the vehicle turns.

In various aspects of the present invention, in the active geometry control suspension according to the present invention, the guide in which a slot is formed absorbs a horizontal load or a vertical load to reduce impact that is directly transferred to the drive motor (actuator or gear box).

Further, the control arm (manipulator) transforms the rotation energy of the drive motor to the line movement of the moving member such that operating efficiency thereof is improved.

In addition, the durability or the stability of a bearing or a gear that is provided in the drive motor or the gear box is enhanced such that the overall life is improved, the manufacturing cost is reduced, and the design becomes simpler.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
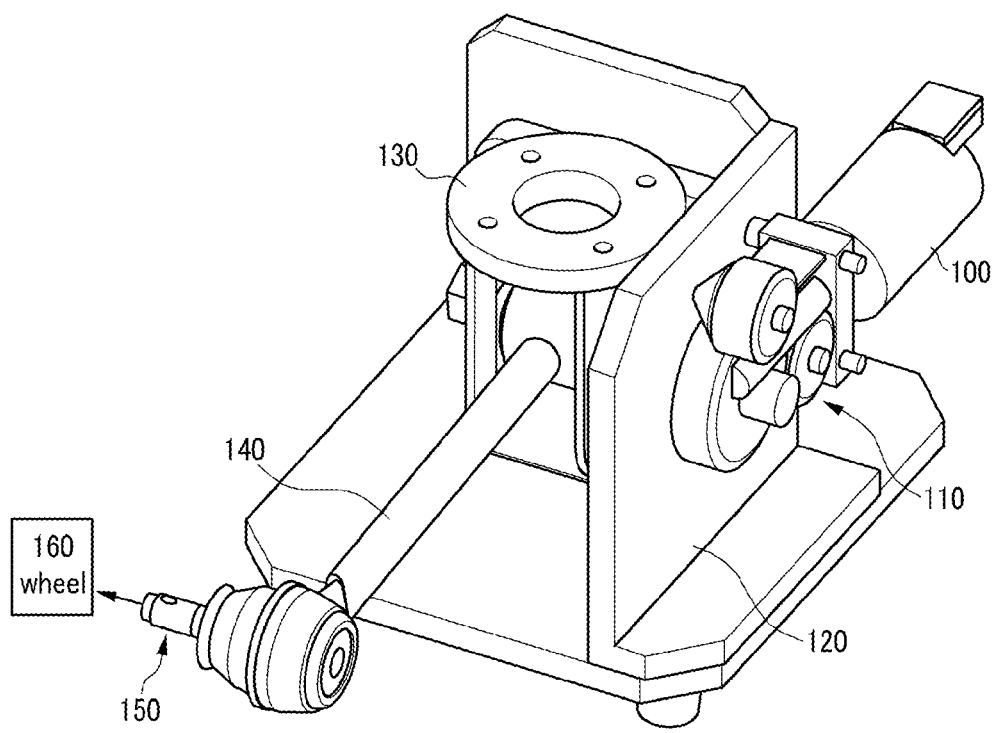
FIG. 1 is a perspective view of an active geometry control suspension according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a perspective view of an active geometry control suspension according to an exemplary embodiment of the present invention.

Referring to FIG. 1, an active geometry control suspension includes a drive motor 100, a gear box 110, a body 120, a fixing bracket 130, an assist link 140, a joint 150, and a wheel 160.

The joint 150, which is connected to the wheel 160, is installed on one end portion of the assist link 140, and the other end of the assist link 140 is coupled to the body 120.

The gear box 110 is mounted on the one side of the body 120, and the drive motor 100 is mounted in the gear box 110. The body 120 is fixed to the vehicle body of the vehicle by the fixing bracket 130 that is disposed at the upper portion thereof.

In an exemplary embodiment of the present invention, the drive motor 100 is controlled by a control portion, and the control portion operates the drive motor 100 according to the driving conditions of the vehicle to vary a position of the assist link 140 through the gear box 110.

Figure 2:
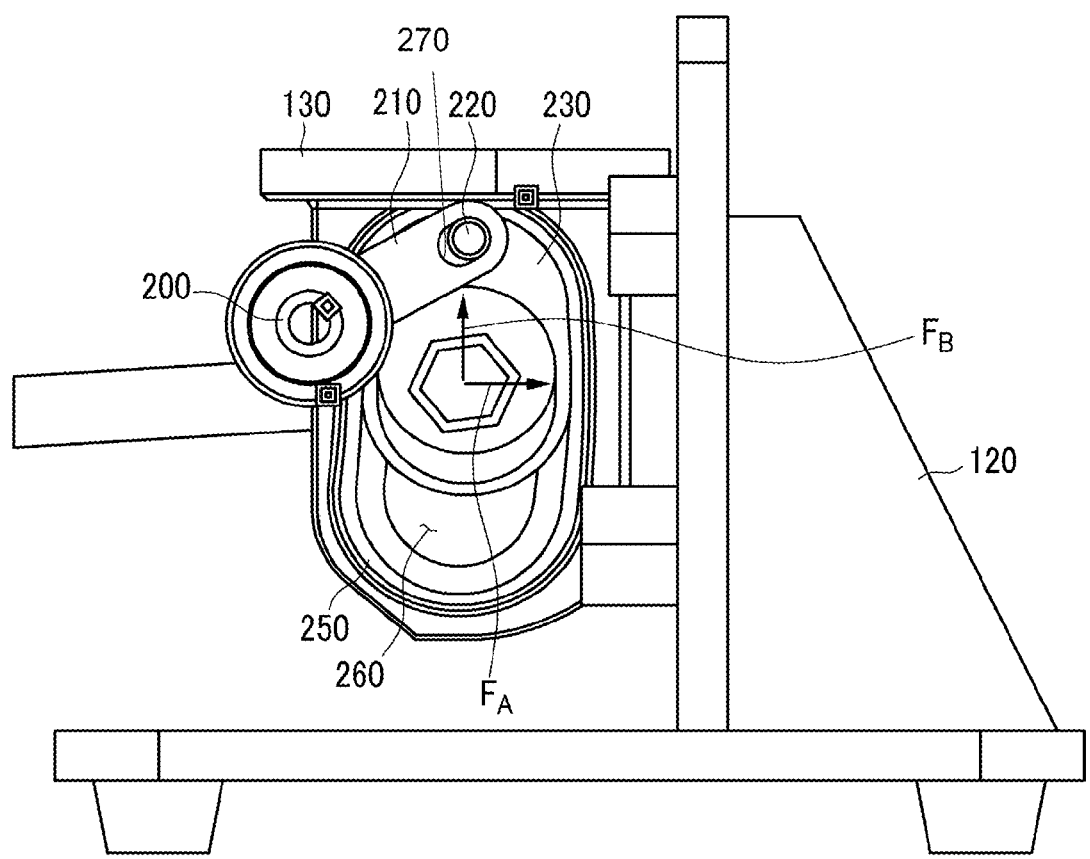
FIG. 2 is a partial exploded side view of an active geometry control suspension according to an exemplary embodiment of the present invention.
Figure 3:
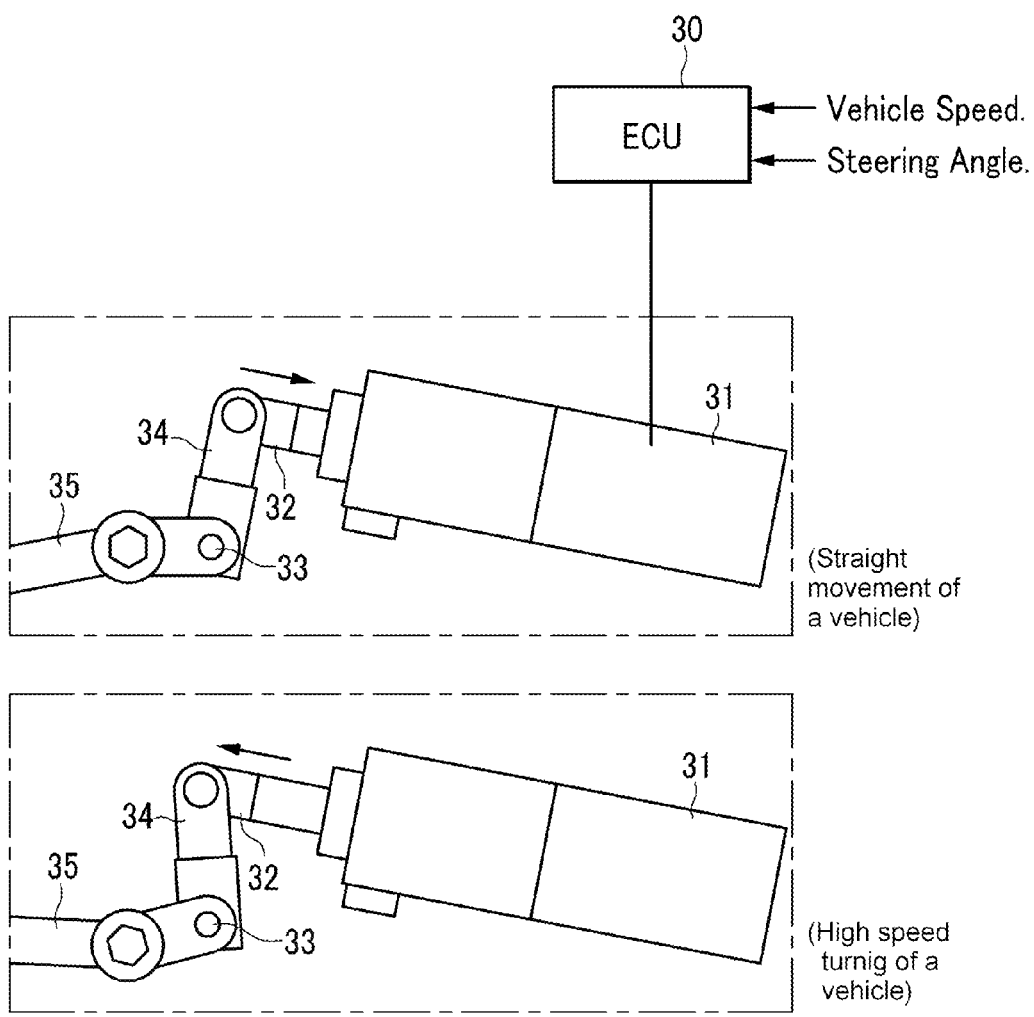
FIG. 3 is a schematic diagram of a general active geometry control suspension.

Referring to FIG. 2, the active geometry control suspension will be explained with detail. FIG. 2 is a partial exploded side view of an active geometry control suspension according to an exemplary embodiment of the present invention.

Referring to FIG. 2, the active geometry control suspension includes a guide 250 that is fixed on the side surface of the body 120, and a slot 260 is formed in the guide 250 in an up-and-down direction.

A moving member 230 is mounted in the slot 260, and the moving member 230 has a structure to move along the slot 260 in the direction thereof. Further, the end portion of the assist link 140 is fixed to the moving member 230 by a fixing bolt.

A drive shaft 200 is rotatably fixed to one side surface of the guide 250 in a predetermined distance from the moving member 230, and the drive shaft 200 is connected to the gear box 110.

Further, a control arm 210 (manipulator) is extended in a vertical direction from the exterior circumference of the drive shaft 200, and the extended end portion of the control arm 210 is connected to the moving member 230 by a connection pin 220 formed in the moving member 230. The extended end portion of the control arm 210 includes a connecting slot 270 coupled to the connecting pin 210 of the moving member 230.

Referring to FIG. 1 and FIG. 2, the operation of the active geometry control suspension will be explained in detail according to an exemplary embodiment of the present invention, wherein firstly, the control portion rotates the drive motor 100 by a predetermined rotation amount.

Then, the rotation torque is increased through the gear box 110, and the torque is transferred to the drive shaft 200. By the rotation of the drive shaft 200, the control arm 210 moves the moving member 230 along the slot 260.

While the moving member 230 is moving in the slot 260, the position of the assist link 140, of which the end portion thereof is fixed to the moving member 230, is varied. Accordingly, the alignment angle of the wheel 160 that is connected to the assist link 140 is varied.

As shown, the assist link 140 is disposed in a left and right direction, the slot 260 is formed in an upper/lower direction, and the drive shaft 200 is disposed in a front and rear direction that is perpendicular to the left/right direction.

Further, the slot 260 is formed along a curved line that has a predetermined curvature radius based on the drive shaft 200, and the moving member 230 is formed along the curved line of the slot 260 to move along the curved line of the curvature radius.

Referring to FIG. 2, when a horizontal impact (Fa) is applied in a rightward direction in the drawing, the impact is applied to the inner side surface of the slot 260 of the guide 250 so the horizontal impact is hardly transferred to the drive shaft 200 or the drive motor 100. Since the slot 260 is curved, the horizontal impact (Fa) may be distributed in a horizontal and vertical direction on the inner surface of the slot 260. In addition, the connecting slot 270 functions as an insulator to block the horizontal impact to the drive shaft 200 or the drive motor 100.

Further, when a vertical impact (Fb) is applied in an up and down direction in the drawing, a relatively small amount of load is transferred to the drive shaft 200.

In a condition in which the moving member 230 goes to the topmost position of the slot 260, almost all of the vertical impact (Fb) is absorbed in the inner upper surface of the slot 260 such that almost no impact is transferred to the drive shaft 200.

In a condition in which the moving member 230 goes down to the lower end of the slot 260, some of the vertical impact (Fb) may be transferred to the drive shaft 200 through the control arm 210. However, because the drive shaft 200 is substantially rotatably fixed to the guide 250, the guide 250 absorbs the vertical impact (Fb) that is transferred to the drive shaft 200 such that the vertical impact is hardly transferred to the drive motor 100 or the gear box 110.

Accordingly, the durability or the stability of a bearing or a gear that is provided in the drive motor 100 or the gear box 110 is enhanced such that the overall life is improved. Further, the manufacturing cost can be reduced, and the design becomes simpler corresponding to the increased durability.

For convenience in explanation and accurate definition in the appended claims, the terms "up", "upper", "down", "lower", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active geometry control suspension, comprising:
   an assist link of which a wheel is connected to one end portion thereof to guide a movement of the wheel;
   a moving member, one portion of which is pivotally fixed to the other end portion of the assist link;
   a guide including a slot to slidably receive the moving member therein;
   a body that is fixed to a vehicle body to connect the guide thereto; and
   a driving portion coupled to the other portion of the moving member and moving the moving member along the slot to vary a position of the assist link and thus to vary an alignment angle of the wheel;
   wherein the driving portion includes:
      a drive shaft rotatably fixed on the guide;
      a control arm that extends in a radial direction from the drive shaft, wherein the control arm is connected to the other portion of the moving member through a connection pin formed in the moving member and wherein the moving member is pivotal with respect to the drive shaft, and;
      a driving actuator that is mounted on the body and selectively actuates the drive shaft to move the moving member along the slot of the guide, and
   wherein the slot has a predetermined curvature radius with respect to the drive shaft and guides the moving member in the slot to move the moving member along a longitudinal direction of the slot.

2. The active geometry control suspension of claim 1, wherein the control arm includes a connecting slot formed along a longitudinal direction of the control arm and configured to be coupled to the connection pin.

3. The active geometry control suspension of claim 1, wherein the other end portion of the assist link and the other portion of the moving member are offset in a predetermined distance therebetween.

4. The active geometry control suspension of claim 1, wherein the driving actuator is a drive motor and a reduction gear is disposed between the drive motor and the drive shaft to increase rotation torque of the drive motor.

5. The active geometry control suspension of claim 1, wherein a longitudinal axis of the assist link and a tangential vector of a movement direction of the moving member do not form a zero or straight angle therebetween.

6. The active geometry control suspension of claim 1, wherein the drive shaft is coupled to the guide in one direction and the slot is formed in the other direction in the guide, the one direction of the drive shaft and the other direction of the slot being approximately perpendicular therebetween.

7. The active geometry control suspension of claim 6, wherein the drive shaft is disposed in a front and rear direction to be rotatably fixed on the body, and the slot is formed in an up and down direction.

8. The active geometry control suspension of claim 1, wherein a fixing bracket is disposed at an end portion of the guide to be connected to a vehicle body.

9. The active geometry control suspension of claim 1, wherein the alignment angle is a toe-in angle, and the toe-in angle is reduced when the vehicle goes straight and is increased when the vehicle turns.

* * * * *